United States Patent Office 3,191,199
Patented June 29, 1965

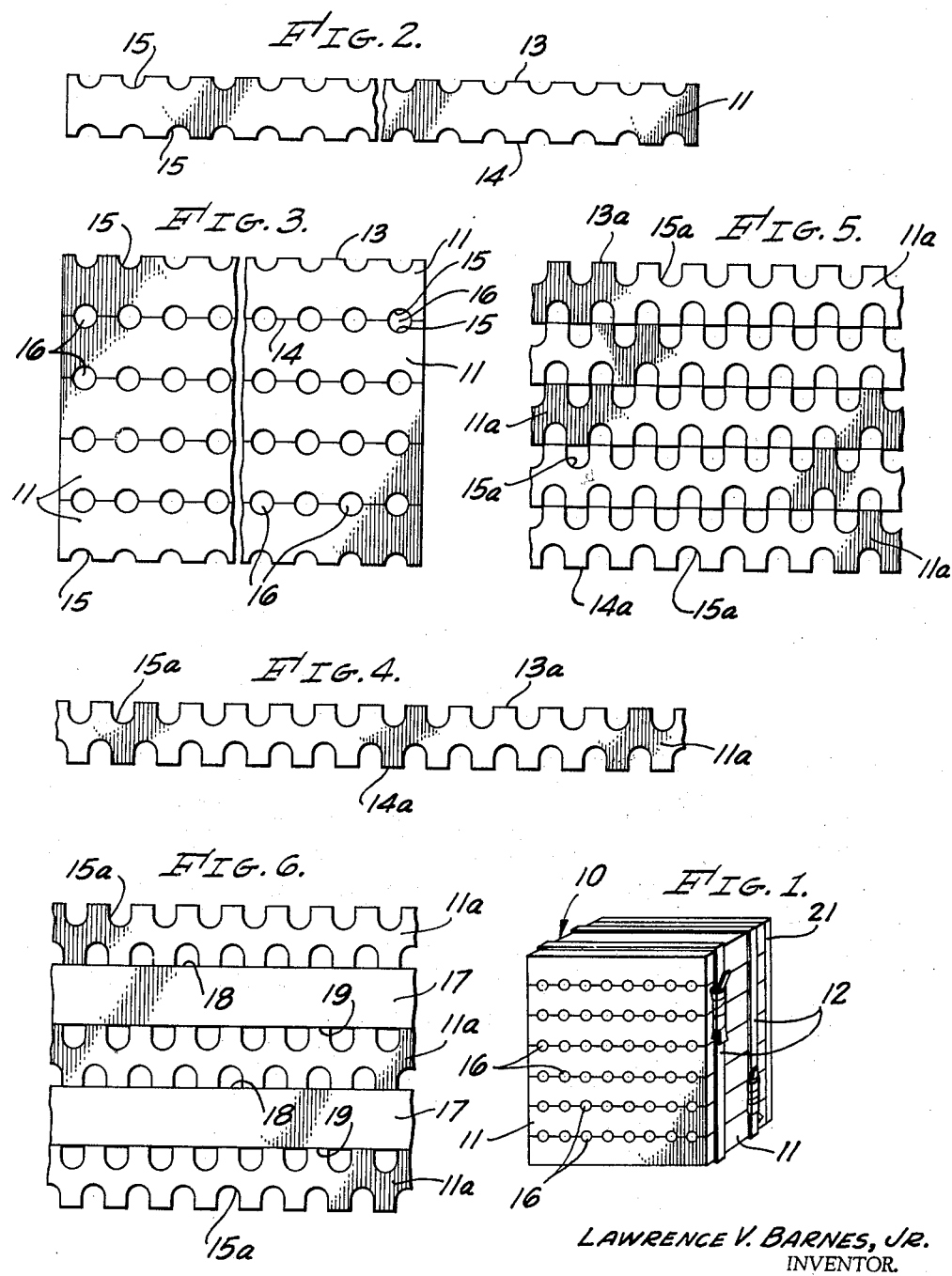

3,191,199
ARTIFICIAL NEST FOR WILD BEES
Lawrence V. Barnes, Jr., Fillmore, Utah, assignor of one-third to Charles B. Reed, Bakersfield, Calif., and one-third to Waterman-Loomus Company, Bakersfield, Calif., a corporation of California
Filed Aug. 5, 1963, Ser. No. 299,986
9 Claims. (Cl. 6—11)

This invention relates to artificial nests for wild bees and is particularly directed to novel apparatus for producing nesting holes for wild bees such as *Megachile rotundata*, sometimes known as leaf-cutter bees.

Wild bees of this type have been used for several years for pollinating alfalfa blossoms for the production of alfalfa seed. Such bees give superior results, as compared to honey bees or alkali bees, in pollinating alfalfa blossoms. However, while honey bees and alkali bees will fly several miles on pollen-seeking missions, the leaf-cutter bees confine their flights to a few hundred feet from their nests, which they build in nail holes, wood cracks, deserted wasps nests, and bug burrows.

Prior to this invention, artificial nesting devices have been constructed for these wild bees, so that the nesting devices can be taken into the alfalfa field and placed at suitable intervals to meet the short flight characteristic of such bees. The artificial nesting devices were made by drilling holes in pine lumber at a right angle to the grain of the lumber. Such holes are initially satisfactory, but tend to become fuzzy inside when they have absorbed moisture from the air, and eventually close almost completely. This former system of providing drilled holes is also tedious and time-consuming. However, it is highly desirable to be able to visually inspect the series of cells in nest holes after completion of the nest, and this could be accomplished only by sawing the nesting material in two, to expose open faces, thereby losing the value of the nest for renesting.

In accordance with this invention, the nesting holes are formed, not by drilling, but by forming parallel grooves in the faces of separate nest segments, the grooves running parallel with the grain of the wood, so that upon stacking of the segments in face-to-face relation, a series of parallel bee-cell openings are formed. When the grooves are formed parallel with the grain of the wood, the fuzzing of the holes is eliminated. In the case of *Megachile rotundata*, the optimum diameter of the nesting holes is about ³⁄₁₆″. The grooving to form the holes is preferably accomplished by laterally spaced rotary knives operating on a flat face of a nest segment.

Other and more detailed objects and advantages of this invention will appear hereinafter.

In the drawings:

FIGURE 1 is a perspective view of an artificial nest embodying a preferred form of this invention.

FIGURE 2 is an end view, partly broken away, showing one of the wood segments used in constructing the nest.

FIGURE 3 is an end view, partly broken away, showing a plurality of wood segments in assembled position, with the horizontal grooves in registry to form bee-cell openings.

FIGURE 4 is a view similar to FIGURE 2, showing a modified form of segment.

FIGURE 5 is an end view, showing how the segments of FIGURE 4 are stacked to form an artificial nest.

FIGURE 6 is an end view, showing another form of nest constructed with segments of the type shown in FIGURE 4 alternating with plain segments without grooves.

Referring to the drawings, the artificial nest generally designated 10 includes a plurality of segments 11, confined in a bundle or unitary assembly by means of suitable straps 12. As shown in FIGURE 2, each of these segments 11 has parallel faces 13 and 14 provided with parallel grooves 15. The grooves are equally spaced and in the preferred form of the invention shown in FIGURES 2 and 3 the grooves are diametrically positioned on opposite faces, one above the other. The grooves extend the full length of the segments and are preferably formed by laterally spaced rotating cutters, not shown. If the segments 11 are made of wood, the grooves 15 extend in a direction substantially parallel to the grain of the wood. The grooves 15 are preferably about ³⁄₃₂″ deep and have a radius of about ³⁄₃₂″.

When the segments 11 are stacked together as shown in FIGURE 3, the grooves 15 on adjacent segments 11 are positioned in registry and thus form bee-cell openings 16, which are substantially ³⁄₁₆″ in diameter. Any desired number of segments may be employed, depending on the size of the artificial nest required. The wood backing plate 21 is stapled to some or all of the segments, and the bands 12 also serve to preserve alignment of the grooves 15. The backing plate 21 closes one end of each of the bee-cell openings.

In the modified form of the invention shown in FIGURES 4 and 5, the segments 11a have parallel faces 13a and 14a, and these faces are provided with parallel, equally spaced grooves 15a. However, the grooves 15a are deeper than the grooves 15 previously described. The maximum depth is approximately ³⁄₁₆″, and the radius of the bottom of the groove is about ³⁄₃₂″. Moreover, the grooves 15a on opposite faces of the segment 11a are staggered, so that the grooves do not register with other grooves when a plurality of identical segments 11a are placed in stacked position. The stacked position of the segments 11a is shown in FIGURE 5. It will be observed that the grooves 15a are staggered on adjacent segments 11a. A large number of bee-cell openings are thus provided by the grooves 15a.

In the further modified form of the invention shown in FIGURE 6, the same segments 11a are employed, but they are placed in alternating relation with other segments 17, which have flat, ungrooved parallel faces 18 and 19. In other respects, the assembly of FIGURE 6 is similar to that described in FIGURE 5.

In each of the forms of the invention described above, accessibility is provided for the removal of completed cells within the nesting material. This is accomplished by merely removing the straps 12 and backing plate 21 and then separating two adjacent segments in order to open up the cells. Also, this provides an easy means to clean and disinfect the nesting material, if necessary. Moreover, it provides a means of visual inspection for the presence of parasites, as well as access for removal of the parasites, if they are found to be present. The cells may be inspected for mortality and for study of the bee habits during the working season, without destroying the nesting material. The fact that the nesting holes can be readily inspected without destroying the nesting material and the fact that the holes may readily be cleaned out for reuse are of particular importance. The nest 10 also provides a convenient device for handling the bees so that they may readily be transported as required, and so that they may be stored for winterizing at about 40° F., for example, and later held at about 70° F., for example, for incubating. The nest 10 may also be used for other types of wild bees, for example, *Concina rotendata*.

Having fully described my invention, it is to be understood that I am not to be limited to the details herein set forth, but that my invention is of the full scope of the appended claims.

I claim:
1. An artificial nest for wild bees comprising a plurality of segments each having parallel faces, removable securing means encircling the segments to secure them together with faces of adjacent segments in contact, at least one of each pair of contacting faces having a plurality of parallel grooves therein and extending to an end of the segment, whereby bee cell openings are defined between each pair of segments, and whereby, upon removal of the securing means any pair of contacting faces may be separated.

2. The device of claim 1 in which the segments are formed of wood.

3. The device of claim 1 in which the segments are formed of wood and wherein the grooves are formed substantially parallel with the grain of the wood.

4. The device of claim 1 in which the grooves are about 3/16-inch wide.

5. An artificial nest for wild bees comprising a plurality of segments each having parallel faces, removable securing means encircling the segments to secure them together with faces of adjacent segments in contact, each of said contacting faces having a plurality of parallel grooves therein and extending to an end of the segment, the parallel grooves of each segment being in registry with parallel grooves of an adjacent segment to define bee-cell openings between each pair of segments, and an end wall secured to at least some of the segments and closing one end of each of the bee-cell openings, whereby, upon removal of the securing means any pair of contacting faces may be separated.

6. The device of claim 5 in which the segments are formed of wood.

7. The device of claim 5 in which the segments are formed of wood and wherein the grooves are formed substantially parallel with the grain of the wood.

8. The device of claim 5 in which the grooves are about 3/16-inch wide.

9. In an artificial nest for wild bees comprising a plurality of segments each having parallel faces, removable securing means encircling the segments to secure them together with faces of adjacent segments in contact, alternate segments having plane surfaces without grooves, the other segments having parallel grooves in both faces extending to an end of the segment, whereby bee cell openings are defined between each pair of segments, whereby, upon removal of the securing means any pair of contacting faces may be separated.

References Cited by the Examiner

UNITED STATES PATENTS

| | | | |
|---|---|---|---|
| 200,549 | 2/78 | Lawther | 6—11 |
| 397,046 | 1/89 | Aspinwall | 6—11 |
| 2,250,683 | 7/41 | Slechta | 161—123 X |
| 2,593,296 | 4/52 | Green | 6—1 X |

FOREIGN PATENTS

| | | |
|---|---|---|
| 163,515 | 7/49 | Austria. |
| 861,536 | 2/61 | Great Britain. |

SAMUEL KOREN, *Primary Examiner.*

LUCIE H. LAUDENSLAGER, *Examiner.*